Dec. 3, 1957 M. MITROVICH 2,814,957
RECIPROCAL MOVEMENT TRANSMITTER HAVING LOST MOTION
Filed Feb. 3, 1955 3 Sheets-Sheet 1

INVENTOR.
Milenko Mitrovich
BY
W. R. Robertson
AGENT

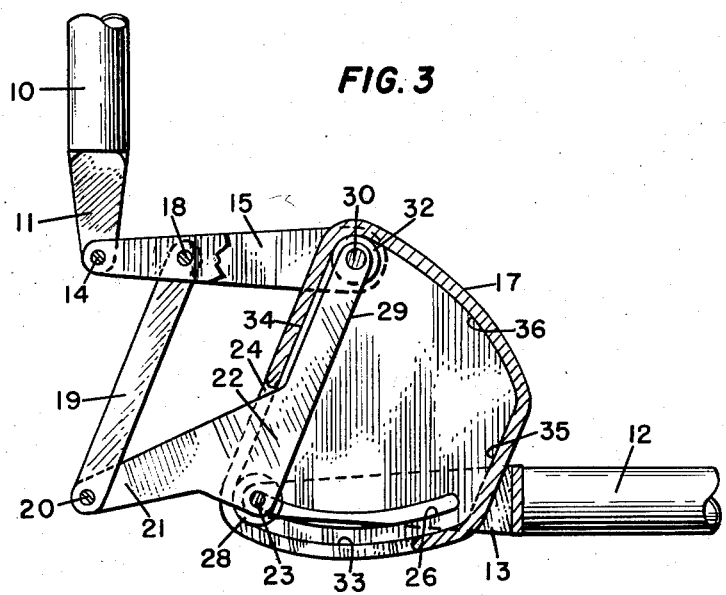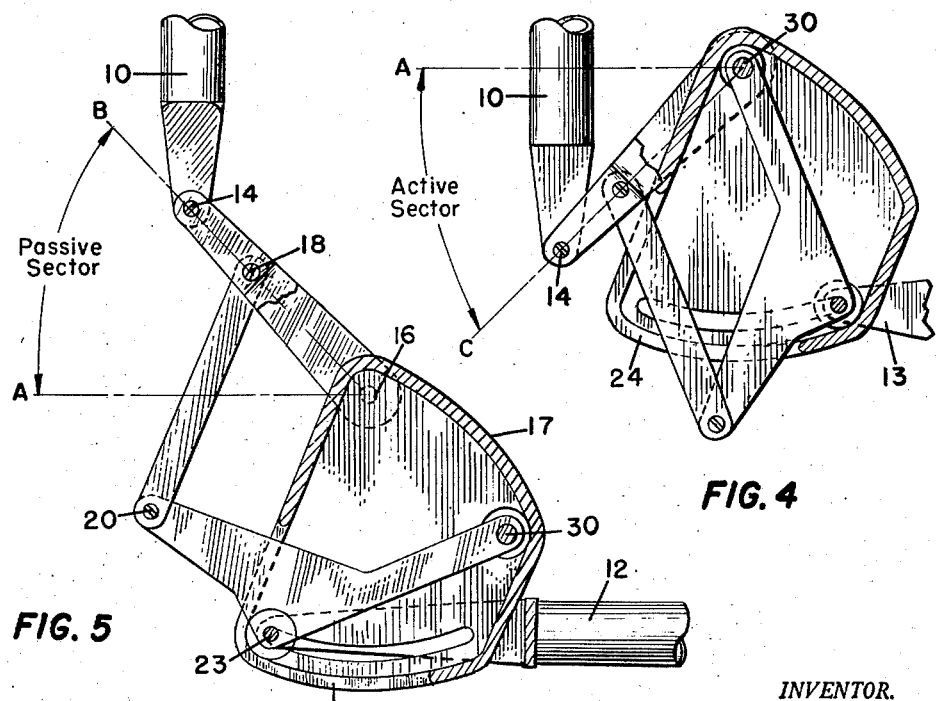

Dec. 3, 1957  M. MITROVICH  2,814,957
RECIPROCAL MOVEMENT TRANSMITTER HAVING LOST MOTION
Filed Feb. 3, 1955  3 Sheets-Sheet 3

INVENTOR.
Milenko Mitrovich
BY W. R. Robertson
AGENT

United States Patent Office 2,814,957
Patented Dec. 3, 1957

2,814,957

RECIPROCAL MOVEMENT TRANSMITTER HAVING LOST MOTION

Milenko Mitrovich, Newton, Mass., assignor to Chance Vought Aircraft, Incorporated, Dallas, Tex., a corporation of Delaware Application February 3, 1955, Serial No. 485,870

10 Claims. (Cl. 74—471)

This invention relates broadly to an improved mechanical movement mechanism or to a reciprocal movement transmitter having lost motion. My invention pertains particularly to a mechanism for governing the extent of actuation of an output element by a reciprocable input element.

More specifically, the invention comprises a movement separator mechanism between two elements whereby movements in one of two sectors of operation of one element provides a resulting movement of the other element; and movement in the other sector of operation of the one element results in overriding or no movement of the other element, leaving it retracted motionless and retained in quiescency.

My invention is suitable for use in control systems operated by levers and linkages, as in the cases of governing a Caterpillar tractor, or the like, or of controlling aircraft. For simplicity, I will describe the override linkage as it may be used in either a Caterpillar tractor or in an airplane. In these two cases, a pair of my linkages are utilized.

In the steering system of a Caterpillar tractor, one track must be rotated slower than the other track to provide for turning of the vehicle. The track to be decelerated is either declutched or braked by the steering control system, and as the other track maintains a constant speed, the tractor is caused to pivot or turn in the direction of the side of the braked wheel. Whether individual foot petals or a central control lever is utilized, only differential braking, as one brake being actuated at a time, is employed for steering.

Likewise, in the conventional aircraft, i. e., that which is controlled by a pilot-operated control lever or wheel about two of the principal axes of the aircraft, the longitudinal axis for roll control and the transverse axis for pitch control, this invention is particularly applicable for use in the roll control system incorporating a spoiler in a wing on each side of the aircraft. The disclosed override linkage or movement separator mechanism may be utilized in duplicate, one with each wing spoiler to provide automatic differential or alternate movement of the spoilers when displaced from their neutral or retracted position whereby only one spoiler is actuated at a time. Accordingly, with the actuation or raising of the spoiler in one wing, a portion of the lift is spoiled or destroyed sufficiently to provide a lowering of the wing relative to the other wing to effect the desired maneuver of the aircraft.

While results similar to those of my mechanical movement mechanism may be obtainable in the U. S. Patent 1,710,002, my reciprocal movement transmitter having lost motion is a great improvement over that and other known prior art as evidenced by the schematic design disclosed herein. The present invention, which provides an overall stronger and more sensitive and accurate override linkage mechanism, comprises links, rollers, and a housing instead of the wire rods with no bearings on a sheet metal plate like that of the above-identified patent. Further, the prior patent is not usable in heavy vehicles or in the aircraft industry due to the weak structure employed throughout, lack of compactness, and high friction joints necessarily employed.

The principal object of my invention is to provide an improved mechanical movement between two reciprocable elements with lost motion in one of the elements.

Another object of this invention is to provide an improved reciprocal movement transmitter whereby the output element is actuated while the input element is operated through one sector of movement and the output element is retained retracted and passive while the input element is operated through another sector of movement.

A further object of this invention is to provide an improved motion transmitter that is substantially frictionless in operation due to two sets of rollers utilized on a rockable bell crank.

A still further object of my invention is to provide an improved override linkage mechanism in which the bell crank is linked between an input element and an output element whereby it may pivot about its apex or about the end of an arm thereof.

Another object of my invention is to provide an improved automatic differential or alternate movement control mechanism wherein with the operation of one output element from a neutral position, the other output element is locked in its neutral retracted position and restrained from movement.

Other objects and advantages of the invention will be apparent from the following detailed description, together with the accompanying drawings, submitted for purposes of illustration only and not intended to define the scope of the invention, reference being had for that purpose to the subjoined claims.

In the drawings:

Fig. 3 is a front elevation of the override linkage mechanism in neutral position with parts cut away for clarity of disclosure;

Fig. 4 is the linkage mechanism of Fig. 3, showing the input element positioned in the active sector of its range of operation wherein the output element is operated to extended position by the input element;

Fig. 5 is the linkage mechanism of Fig. 3 showing the input element positioned in its passive sector of operation wherein the output element is overridden by the input element and is retained in fixed, motionless position.

Figure 1:
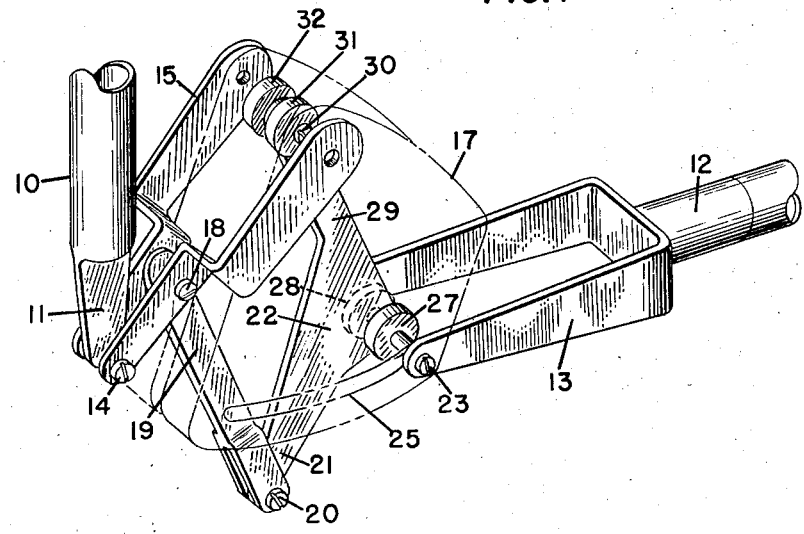
Fig. 1 is a perspective view of the override linkage mechanism with the housing shown in phantom.

In Fig. 1 is illustrated the improved mechanical movement or override linkage mechanism, which may be further described as a reciprocal movement transmitter having lost motion, with the housing shown in phantom. An input element 10 and an output element 12 are illustrated as hollow torque tubes, or the like, wherein the input element is substantially normal to the output element. Input element 10 is pivotally connected at its flat headed end 11 to a double forked-headed link 15 by pin 14. Link 15 is pivotally connected at its other end to studs 16, Fig. 2, which are fixedly attached to the upper portion of the front and rear walls externally of the housing 17. The housing is fixedly secured at a convenient location on a vehicle requiring the differential control movements set forth herein.

Intermediate the ends of double forked-headed link 15 is pivotally attached link 19 at a flat headed end thereof by pin 18. The other end of bifurcated end of link 19 is pivotally attached by pin 20 to the arm 21 of a rockable bell crank 22 which will be described hereinafter. At the apex of bell crank 22 is pivotally connected the bifurcated end 13 of output element 12 by pin 23. This pin 23 extends from one prong of the bifurcated end 13 through the slot 25 in the front face of housing 17, through the apex of the bell crank, and through the slot 26 in the rear face of the housing to connect with the other prong of the bifurcated end 13 of output element 12. Fig. 1 shows the output element 12 in extended position.

Figure 2:
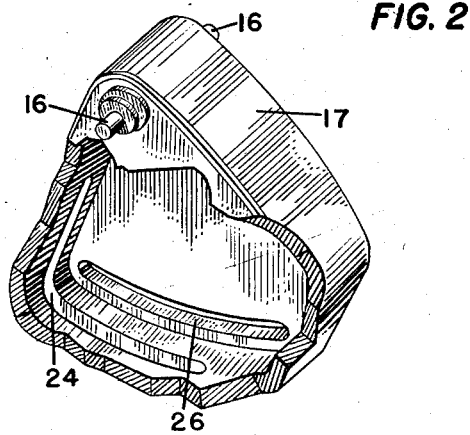
Fig. 2 is a perspective view of the housing per se with the front face cut away for clarity of disclosure.

Fig. 2 illustrates housing 17 with the front face removed. A slot 24 is formed in the center of the bottom of the housing, and extends around the lower left end, as viewed in Figs. 2–5, and up the left side a substantial distance to provide a clearance space for the arm 21 of bell crank 22 to protrude from within the housing 17. Likewise, slot 24 is large enough to accommodate link 19, particularly when the linkage mechanism is in the extreme position shown by Fig. 4. In addition to the bottom center slot 24, two arcuate slots 25 and 26 are formed in housing 17, one in the lower portion of each of the front and rear walls, respectively, of the housing. These slots 25, 26 permit pin 23 to completely penetrate housing 17 to extend from each of the front and rear faces thereof and to connect with both prongs of bifurcated end 13 of output element 12, as disclosed in Fig. 1.

Rockable bell crank 22, shown in full in Fig. 1 has two rollers, 27 and 28, rotatably mounted on connecting pin 23 extending through the apex of the bell crank. A second arm 29 of the bell crank 22 carries a short pin 30 with rollers 31, 32 rotatably mounted on each end thereof. While a pair of rollers on each pin is preferable, they may be used singularly if so desired.

As shown in the cutaway views, Figs. 3, 4, bell crank apex rollers 27, 28 actuate in lower track 33 as the bifurcated end 13 of output element 12 is actuated to extended position. The side walls 34, 35, of housing 17 act as stops for limiting the travel of the apex rollers, 27, 28. Rollers 31, 32 of bell crank arm 29 actuate in upper track 36 Figs. 3, 5 with side walls 34 and 35 likewise acting as the stops for limiting the travel of the arm rollers. In the extreme positions of the bell crank 22 shown in Figs. 1, 3 and 4, the longitudinal axes of the short pin 30 and of rollers 31, 32 are colinear with the longitudinal axis of housing studs 16 for ease of removal of pin 30.

In operation, the override linkage mechanism is shown in neutral position in Fig. 3, in which input element 10 assumes a position which is common to both sectors of operations, the active or positive action sector defined by angle A–30–C, Fig. 4, and the passive, overriding, or lost motion sector defined by angle A–16–B, Fig. 5.

In its neutral position, double forked-headed link 15 assumes the horizontal position, i. e., substantially normal to input element 10 and substantially paralled to output element 12.

With reciprocal vertical movement of the input element 10 below the neutral position of Fig. 3 into the active sector, angle A–30–C of Fig. 4, forces resulting on bell crank arm 21 cause rockable bell crank 22 to pivot about the end of the other arm 29 or about pin 30 rotatable in rollers 31, 32. Therefore latter rollers 31, 32 provide substantially frictionless bearings for pivotal movement of rockable bell crank 22 about the end of an arm thereof. Accordingly, operation of input element 10 in its active sector produces a positive actuation of output element 12 from its retracted position to its extended position. Attendant with actuation of output element 12, guide rollers 27, 28 operate in guideway or track 33 and connecting pin 23 operates in housing front and rear slots 25 and 26, respectively, with housing sidewalls 34 and 35 forming stops for rollers 27, 28 for limiting the extent of reciprocal movement of the mechanical movement transmitter.

With reciprocal vertical movement of the input element 10 above the neutral position of Fig. 3 into the passive sector, angle A–16–B illustrated in Fig. 5, forces resulting on bell crank arm 21 cause the rockable bell crank 22 to pivot about the bell crank apex or connecting pin 23 rotatable in rollers 27, 28. With the input element 10 operating in the passive sector of its range of operation, the latter rollers 27, 28 provide low friction bearings for pivotal movement of rockable bell crank 22 about its apex as guide rollers 31, 32 on bell crank arm 29 operate in track 36. Therefore, attendant with reciprocal movement of element 10 in the passive sector, motion is not transmitted to output element 12, but is absorbed in the linkage mechanism whereby the output element is overridden and retained in retracted position.

Figure 6:
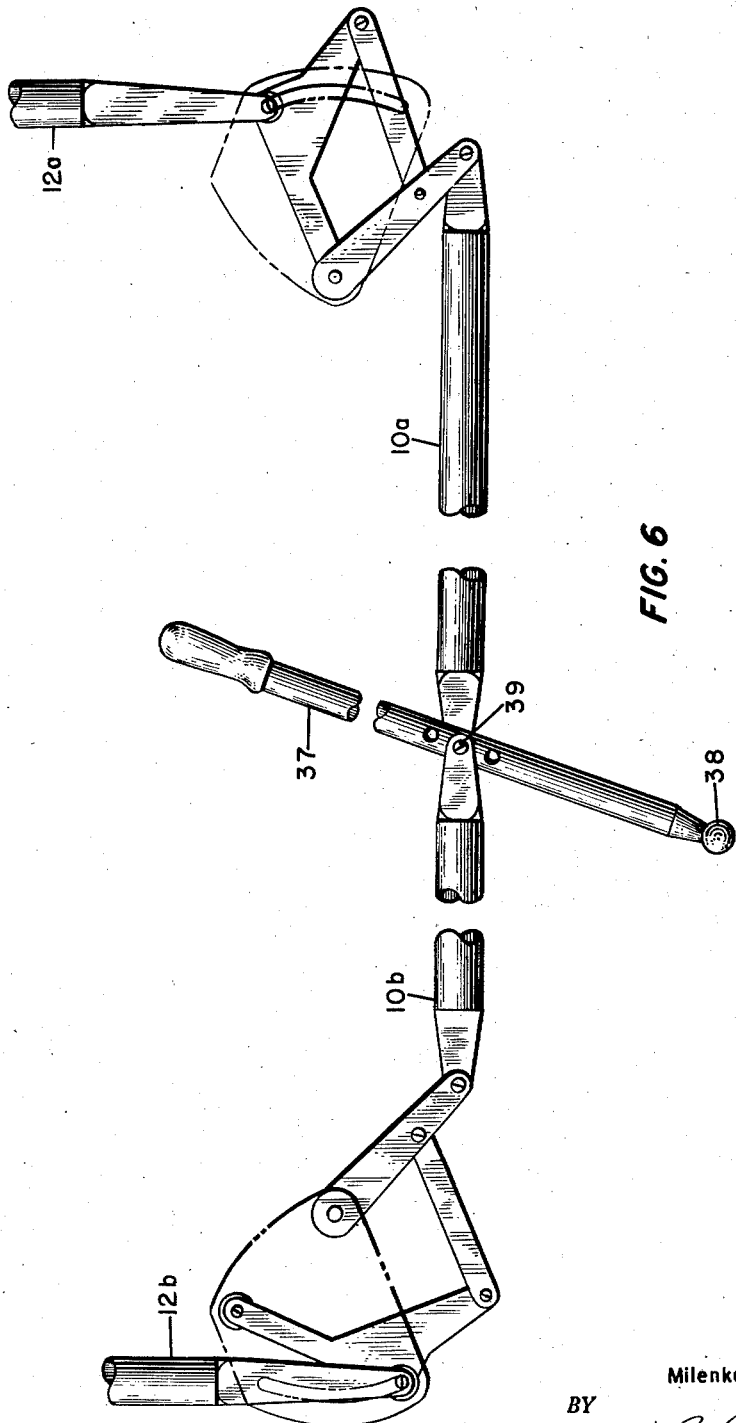
Fig. 6 is a view illustrating a pair of the improved mechanical movements connected to a common control lever.

Fig. 6 discloses the principal use of my invention when incorporated in a vehicle steering control system. A control lever 37 is operable transversely in a joint 38 for mounting on the vehicle (not shown). With the enantiomorphic input elements 10a and 10b of the two reciprocal movement transmitters having lost motion operably connected to and extending from opposite sides of the common control lever 37, by pin 39, automatic differential or alternate movement is produced in the two, right and left, output elements 12a and 12b, shown at the right and left ends of Fig. 6. When the control lever 37 is in neutral position, both transmitters assume the neutral position shown in Fig. 3 and maintain the output elements 12a and 12b in retracted position. When control lever 37 is actuated to one side, as to the right side, Fig. 6, the left input element 10b operates in its passive sector and accordingly the left output element 12b is retained motionless and in retracted position, while the right output element 12a is positively actuated by movement of the control lever to the right to raise the right spoiler to lower the right wing when used in an aircraft control system. Likewise, when control lever 37 is actuated to the left side as viewed in Fig. 6, the right input element 10a operates in its passive sector and accordingly the right output element 12a is retained motionless and in retracted position, while the left output element 12a is positively actuated by movement of the control lever to the right.

It will be obvious to those skilled in the art that various changes may be made in the invention without departing from the spirit and scope thereof and therefore the invention is not limited by that which is shown in the drawings and described in the specification, but only as indicated in the appended claims.

I claim:

1. An override linkage mechanism comprising, a fixed housing with first and second spaced apart tracks therein, a rockable bell crank having a first roller on the end of an arm thereof and a second roller at the apex thereof, a reciprocable input element having a range of operation comprising an active sector and a passive sector, a lever pivotally connecting said reciprocable input element and said housing, a link pivotally interconnected between said lever and said bell crank, and a reciprocable output element pivotally connected to said rockable bell crank so that operation of said input element in its active sector actuates said link to pivot said bell crank about said roller on said first track causing said bell crank to roll on said second roller on said second track for actuating said output element and operation of said input element in its passive sector actuates said link to pivot said bell crank about said second roller causing said bell crank to roll on said first roller to retain said output element motionless.

2. A reciprocal movement transmitter having lost motion comprising, a fixed housing, a bell crank rockably mounted in said housing, a reciprocable input element, a lever pivotally connected between said reciprocable input element and said housing, a link having one end pivotally connected intermediate the ends of said lever and the other end of said link pivotally connected to the end of an arm of said bell crank for pivoting said bell crank about either its apex or its other arm end, and a reciprocable output element pivotally connected to the apex of said bell crank.

3. A reciprocal movement transmitter having lost motion comprising, a fixed housing, a bell crank rockably mounted in said housing, a reciprocable input means having a range of operation comprising an active sector and a passive sector, and a reciprocable output means pivoted to the apex of said bell crank for receiving motion therefrom, said input means pivotally linked to both said housing and to the end of an arm of said bell crank to pivot said bell crank about the other arm end to provide actuation of said output means when said input means is in its active sector and to pivot said bell crank about said apex to provide retention of said output means motionless when said input means is in its passive sector.

4. A motion transmitter as recited in claim 3 wherein said fixed housing has two spaced apart tracks and said bell crank has rollers operable in said tracks.

5. A motion transmitter as recited in claim 4 wherein one of said rollers is mounted at the apex of said rockable bell crank and the other of said rollers is mounted at the end of the other arm of said bell crank whereby said bell crank may pivot about either said apex or the other arm end.

6. A motion transmitter as recited in claim 5 wherein said fixed housing has two side walls, and said side walls forming stop means for limiting the movement of any one of said rollers in said tracks when said bell crank is pivoted about the other of said rollers.

7. A motion transmitter as recited in claim 3 wherein a lever is pivotally interconnected between said input means and said housing, and a link, one end of said link being pivotally connected intermediate the ends of said lever, and the other end of said link being pivotally connected to the end of the first mentioned arm of said bell crank.

8. A motion transmitter as recited in claim 3 wherein said fixed housing has front and rear walls, each wall having similar elongated slots, each slot positioned directly oppositely from the other slot, and a pin extending through the apex of said bell crank and outwardly through both of said slots to pivotally connect said reciprocable output means to said bell crank.

9. A reciprocal movement transmitter having lost motion comprising, a fixed housing having a front, rear, and two side walls, said housing having two spaced apart tracks mounted therein, diametrically oppositely positioned slots in said front and rear walls, a rockable bell crank having a roller in each of said tracks, one of said rollers mounted at the apex of said bell crank, the other of said rollers mounted at the end of an arm of said bell crank whereby said bell crank may pivot respectively about either said apex or said arm end, said side walls forming stop means for limiting the movement of any one of said rollers when said bell crank is pivoted about the other of said rollers, a reciprocable input element having a range of operation comprising an active sector and a passive sector, a lever pivotally connecting said reciprocable input element to said housing, a link having one end pivotally connected intermediate the ends of said lever and the other end pivotally connected to the end of said bell crank other arm, a reciprocable output element having a bifurcated end, and a pin extending through the apex of said bell crank and outwardly through both of said slots to pivotally connect the bifurcated end of said output element to said bell crank whereby operation of said input element in the active sector of said input element actuates said output element and operation of said input element in the passive sector of said input element retains said output element motionless so that said output element is overridden by said input element.

10. An improved mechanical movement mechanism comprising, two reciprocal movement transmitters having lost motion, each of said transmitters including a fixed housing, a bell crank rockably mounted in said housing, a reciprocable input means having a range of operation comprising an active sector and a passive sector, and a reciprocable output means pivoted to the apex of said bell crank for receiving motion from said bell cank, said input means being pivotally linked to both said housing and to the end of an arm of said bell crank to pivot said bell crank about the other arm end to provide actuation of said output means when said input means is in its active sector and to pivot said bell crank about said apex to provide retention of said output means motionless when said input means is in its passive sector, each of said reciprocable input means being operable by a common control lever whereby actuation of said control lever in one direction operates said input means of one of said transmitters in its active sector of range of operation to provide positive actuation of its output means while said actuation of said control lever in said one direction operates said input means of the other of said transmitters in its passive sector of range of operation to provide retention of the other output means motionless.

References Cited in the file of this patent

UNITED STATES PATENTS

| 1,020,261 | Campbell | Nov. 12, 1912 |
| 1,564,261 | Mathieson et al. | Dec. 8, 1925 |

FOREIGN PATENTS

| 716,697 | Germany | Jan. 27, 1942 |